(12) United States Patent
Han et al.

(10) Patent No.: US 12,067,241 B2
(45) Date of Patent: Aug. 20, 2024

(54) STORAGE MANAGEMENT SYSTEM AND METHOD

(71) Applicant: Dell Products, L.P., Round Rock, TX (US)

(72) Inventors: Gang Han, Beijing (CN); Vladimir Shveidel, Pardes Hana (IL); Jibing Dong, Beijing (CN)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 17/968,939

(22) Filed: Oct. 19, 2022

(65) Prior Publication Data
US 2024/0134524 A1 Apr. 25, 2024
US 2024/0231618 A9 Jul. 11, 2024

(51) Int. Cl.
*G06F 3/06* (2006.01)

(52) U.S. Cl.
CPC ............ *G06F 3/061* (2013.01); *G06F 3/0655* (2013.01); *G06F 3/0679* (2013.01)

(58) Field of Classification Search
CPC ....... G06F 3/061; G06F 3/0655; G06F 3/0679
See application file for complete search history.

(56) References Cited

U.S. PATENT DOCUMENTS

2018/0276142 A1* 9/2018 Algieri .................. G06F 3/0619

* cited by examiner

*Primary Examiner* — Charles Rones
*Assistant Examiner* — Jonah C Krieger
(74) *Attorney, Agent, or Firm* — Brian J. Colandreo; Heath M. Sargeant; Holland & Knight LLP

(57) ABSTRACT

A method, computer program product, and computing system for assigning flush ownership for a plurality of containers of a common frozen flushing work set to a storage processor of a pair of storage processors of a storage system. For each container of the plurality of containers of the common frozen flushing work set not assigned to a particular storage processor, the storage space of the container not assigned to the particular storage processor is reclaimed. For each container of the plurality of containers of the common frozen flushing work set assigned to a particular storage processor, data stored in the container assigned to the particular storage processor is flushed to persistent memory of the storage system.

20 Claims, 8 Drawing Sheets

STORAGE MANAGEMENT SYSTEM AND METHOD

BACKGROUND

Storing and safeguarding electronic content may be beneficial in modern business and elsewhere. Accordingly, various methodologies may be employed to protect and distribute such electronic content.

For example, when processing data in an active-active cluster/storage system, the data is mirrored across duplicated flushing work sets. However, flushing data using multiple storage processors in the storage system requires a significant memory overhead to maintain flushing work sets across each storage processor.

SUMMARY OF DISCLOSURE

In one example implementation, a computer-implemented method executed on a computing device may include, but is not limited to, assigning flush ownership for a plurality of containers of a common frozen flushing work set to a storage processor of a pair of storage processors of a storage system. For each container of the plurality of containers of the common frozen flushing work set not assigned to a particular storage processor, the storage space of the container not assigned to the particular storage processor is reclaimed. For each container of the plurality of containers of the common frozen flushing work set assigned to a particular storage processor, data stored in the container assigned to the particular storage processor is flushed to persistent memory of the storage system.

One or more of the following example features may be included. The pair of storage processors define an active-active cluster. A plurality of write input/output (TO) operations are processed on the active-active cluster by mirroring the plurality of write IO operations on each storage processor of the active-active cluster. The common frozen flushing work set includes a plurality of extent storage objects, wherein the plurality of extent storage objects includes the plurality of containers. An XCOPY source container set is assigned to a first storage processor and an XCOPY destination container set is assigned to a second storage processor. Flushing the XCOPY source container set assigned to the first storage processor includes: flushing a plurality of containers received before the XCOPY command from the XCOPY source container set, executing the XCOPY command using the first storage processor, and flushing a plurality of containers received after the XCOPY command from the XCOPY source container set. Flushing the XCOPY destination container set assigned to the second storage processor includes flushing a plurality of containers received after the XCOPY command from the XCOPY destination container set assigned to the second storage processor in response to executing the XCOPY command using the first storage processor. A storage processor failure event is detected. IO command processing for IO commands received after detecting the storage processor failure event is paused. A plurality of containers assigned to the failed storage processor are identified. The plurality of identified containers assigned to the failed storage processor are reconstructed in a surviving storage processor and IO command processing is resumed.

In another example implementation, a computer program product resides on a computer readable medium that has a plurality of instructions stored on it. When executed by a processor, the instructions cause the processor to perform operations that may include, but are not limited to, assigning flush ownership for a plurality of containers of a common frozen flushing work set to a storage processor of a pair of storage processors of a storage system. For each container of the plurality of containers of the common frozen flushing work set not assigned to a particular storage processor, the storage space of the container not assigned to the particular storage processor is reclaimed. For each container of the plurality of containers of the common frozen flushing work set assigned to a particular storage processor, data stored in the container assigned to the particular storage processor is flushed to persistent memory of the storage system.

One or more of the following example features may be included. The pair of storage processors define an active-active cluster. A plurality of write input/output (IO) operations are processed on the active-active cluster by mirroring the plurality of write IO operations on each storage processor of the active-active cluster. The common frozen flushing work set includes a plurality of extent storage objects, wherein the plurality of extent storage objects includes the plurality of containers. An XCOPY source container set is assigned to a first storage processor and an XCOPY destination container set is assigned to a second storage processor. Flushing the XCOPY source container set assigned to the first storage processor includes: flushing a plurality of containers received before the XCOPY command from the XCOPY source container set, executing the XCOPY command using the first storage processor, and flushing a plurality of containers received after the XCOPY command from the XCOPY source container set. Flushing the XCOPY destination container set assigned to the second storage processor includes flushing a plurality of containers received after the XCOPY command from the XCOPY destination container set assigned to the second storage processor in response to executing the XCOPY command using the first storage processor. A storage processor failure event is detected. IO command processing for IO commands received after detecting the storage processor failure event is paused. A plurality of containers assigned to the failed storage processor are identified. The plurality of identified containers assigned to the failed storage processor are reconstructed in a surviving storage processor and IO command processing is resumed.

In another example implementation, a computing system includes at least one processor and at least one memory architecture coupled with the at least one processor, wherein the at least one processor configured to assign flush ownership for a plurality of containers of a common frozen flushing work set to a storage processor of a pair of storage processors of a storage system. The at least one processor may be further configured to, for each container of the plurality of containers of the common frozen flushing work set not assigned to a particular storage processor, reclaim the storage space of the container not assigned to the particular storage processor. The at least one processor may be further configured to, for each container of the plurality of containers of the common frozen flushing work set assigned to a particular storage processor, flush data stored in the container assigned to the particular storage processor to persistent memory of the storage system.

One or more of the following example features may be included. The pair of storage processors define an active-active cluster. A plurality of write input/output (TO) operations are processed on the active-active cluster by mirroring the plurality of write TO operations on each storage processor of the active-active cluster. The common frozen flushing work set includes a plurality of extent storage objects, wherein the plurality of extent storage objects includes the plurality of containers. An XCOPY source container set is assigned to a first storage processor and an XCOPY destination container set is assigned to a second storage processor. Flushing the XCOPY source container set assigned to the first storage processor includes: flushing a plurality of containers received before the XCOPY command from the XCOPY source container set, executing the XCOPY command using the first storage processor, and flushing a plurality of containers received after the XCOPY command from the XCOPY source container set. Flushing the XCOPY destination container set assigned to the second storage processor includes flushing a plurality of containers received after the XCOPY command from the XCOPY destination container set assigned to the second storage processor in response to executing the XCOPY command using the first storage processor. A storage processor failure event is detected. IO command processing for IO commands received after detecting the storage processor failure event is paused. A plurality of containers assigned to the failed storage processor are identified. The plurality of identified containers assigned to the failed storage processor are reconstructed in a surviving storage processor and IO command processing is resumed.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
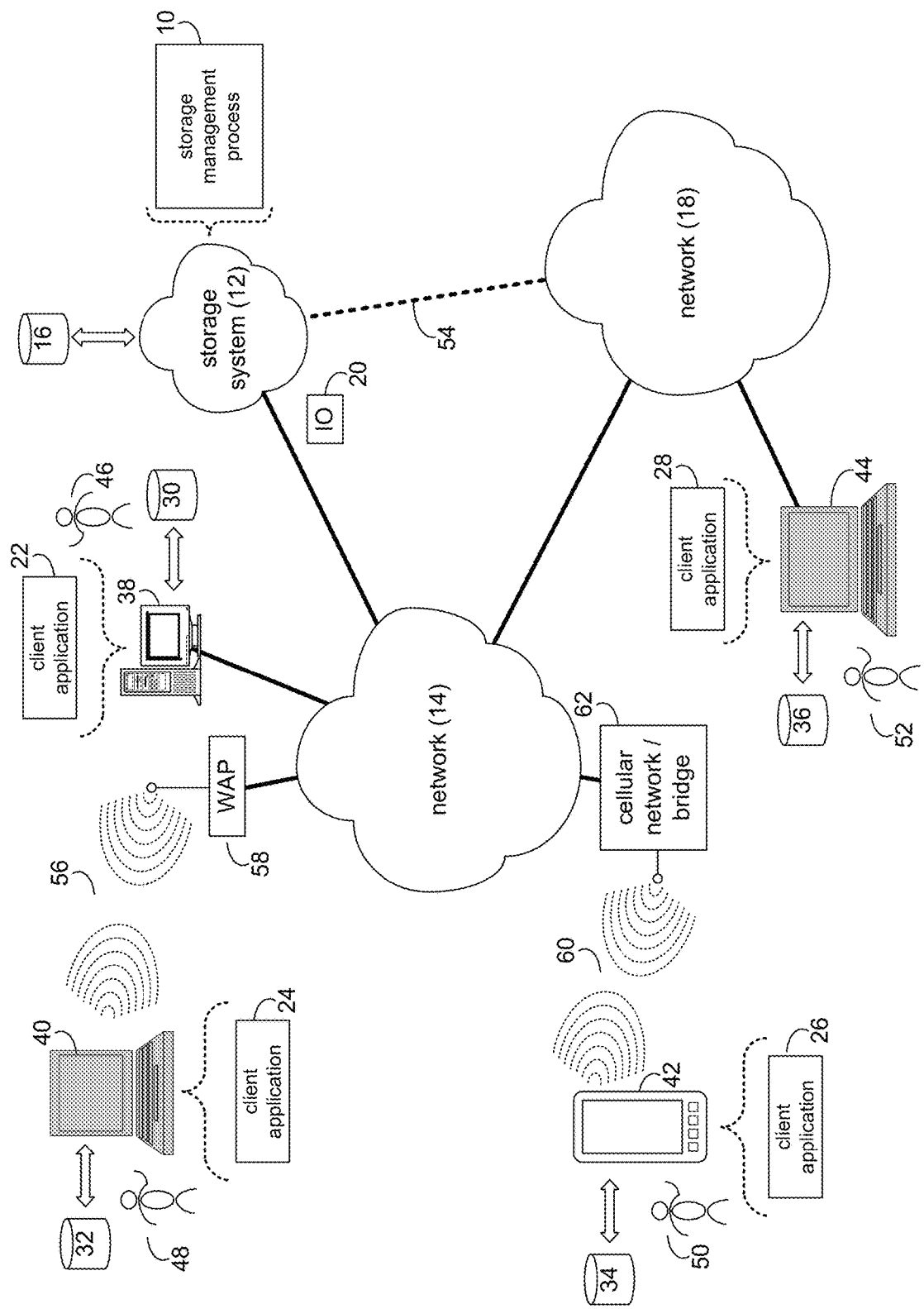
FIG. 1 is an example diagrammatic view of a storage system and a storage management process coupled to a distributed computing network according to one or more example implementations of the disclosure.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of storage management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage management process, such as storage management process 10 of FIG. 1, may include but is not limited to, assigning flush ownership for a plurality of containers of a common frozen flushing work set to a storage processor of a pair of storage processors of a storage system. For each container of the plurality of containers of the common frozen flushing work set not assigned to a particular storage processor, the storage space of the container not assigned to the particular storage processor is reclaimed. For each container of the plurality of containers of the common frozen flushing work set assigned to a particular storage processor, data stored in the container assigned to the particular storage processor is flushed to persistent memory of the storage system.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
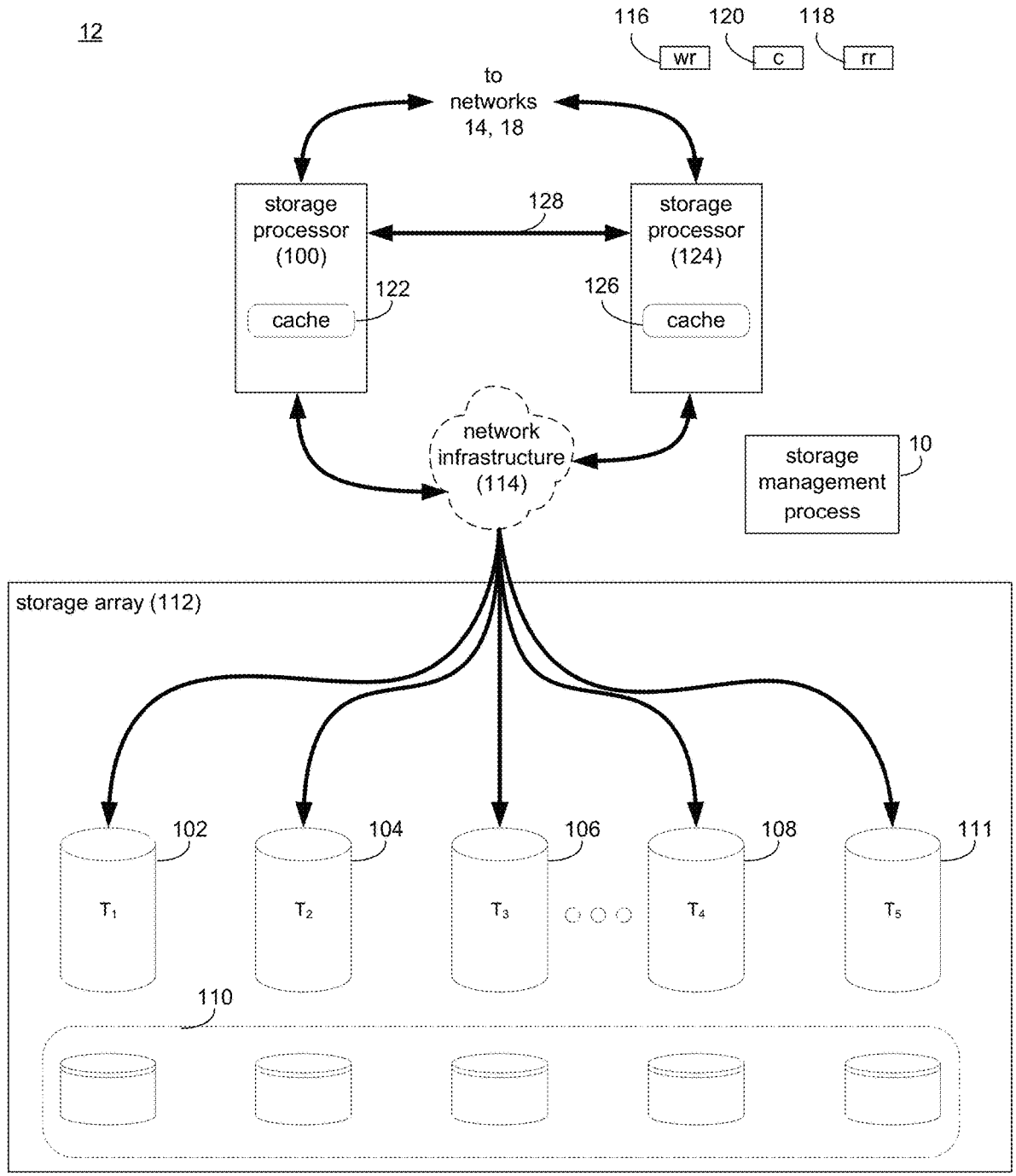
FIG. 2 is an example diagrammatic view of the storage system of FIG. 1 according to one or more example implementations of the disclosure.
Figure 3:
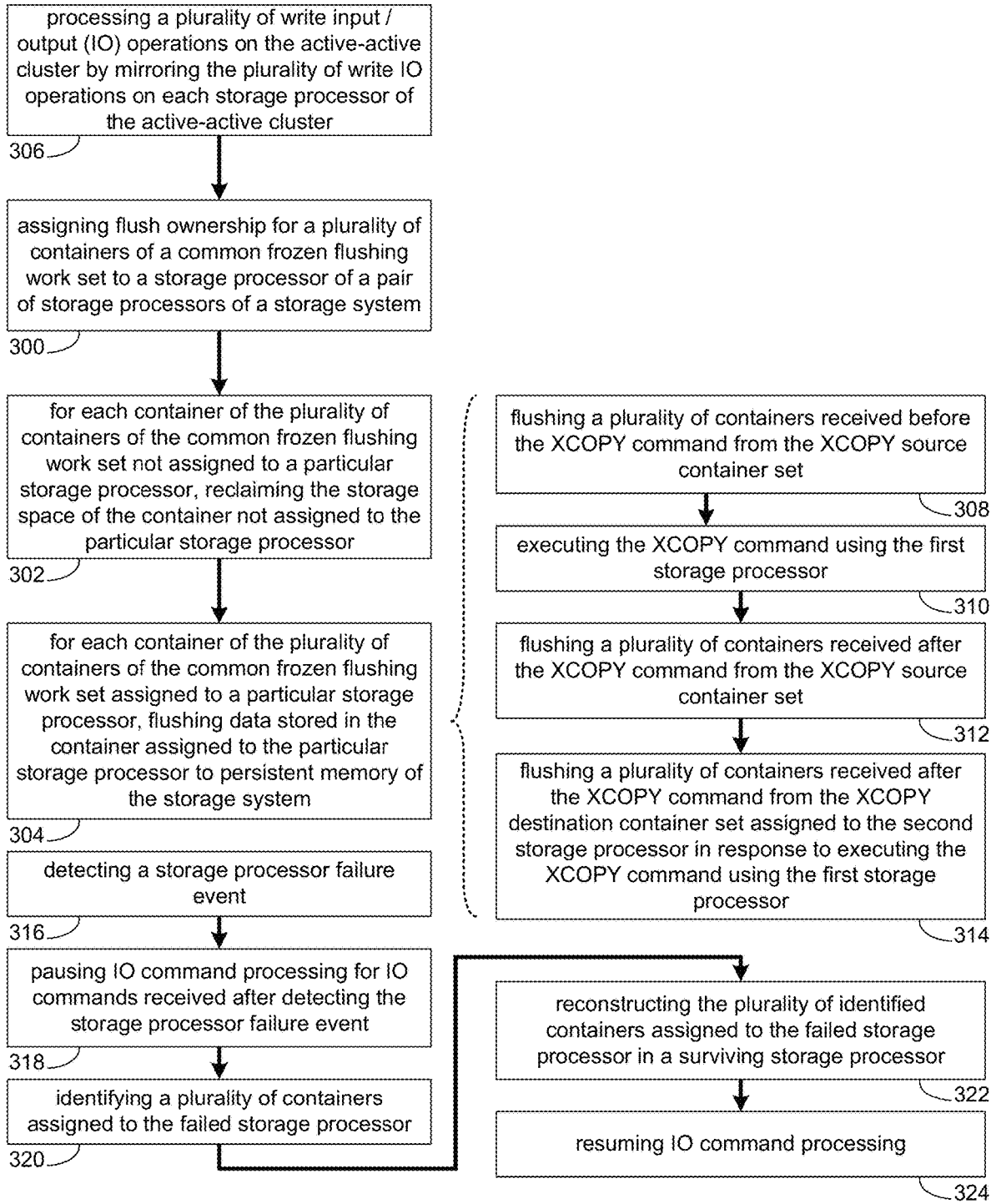
FIG. 3 is an example flowchart of storage management process according to one or more example implementations of the disclosure.

The Storage System:

Referring also to FIG. 2, storage system 12 may include storage processor 100 and a plurality of storage targets T1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of storage management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of storage management process 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Storage Management Process:

Referring also to the examples of FIGS. 3-8 and in some implementations, storage management process 10 may assign 300 flush ownership for a plurality of containers of a common frozen flushing work set to a storage processor of a pair of storage processors of a storage system. For each container of the plurality of containers of the common frozen flushing work set not assigned to a particular storage processor, the storage space of the container not assigned to the particular storage processor is reclaimed 302. For each container of the plurality of containers of the common frozen flushing work set assigned to a particular storage processor, data stored in the container assigned to the particular storage processor is flushed 304 to persistent memory of the storage system.

As will be discussed in greater detail below, implementations of the present disclosure may allow for more efficient flushing of data in an active-active cluster by generating asymmetric flushing work sets. For example, conventional approaches to flushing work sets copy flushing work sets to each storage processor. However, the memory consumed by each flushing work set is only reclaimed when both storage processors flush their data. In this manner, conventional approaches require significant memory overhead to maintain flushing work sets on each storage processor. In some implementations, with asymmetric flushing work sets, individual portions of each flushing work set are reclaimed for reutilization. In this manner, portions of memory are reclaimed from the flushing work sets of each storage processor. These reclaimed portions of memory can be utilized for processing new IO content/"dirty" data for flushing.

Figure 4:
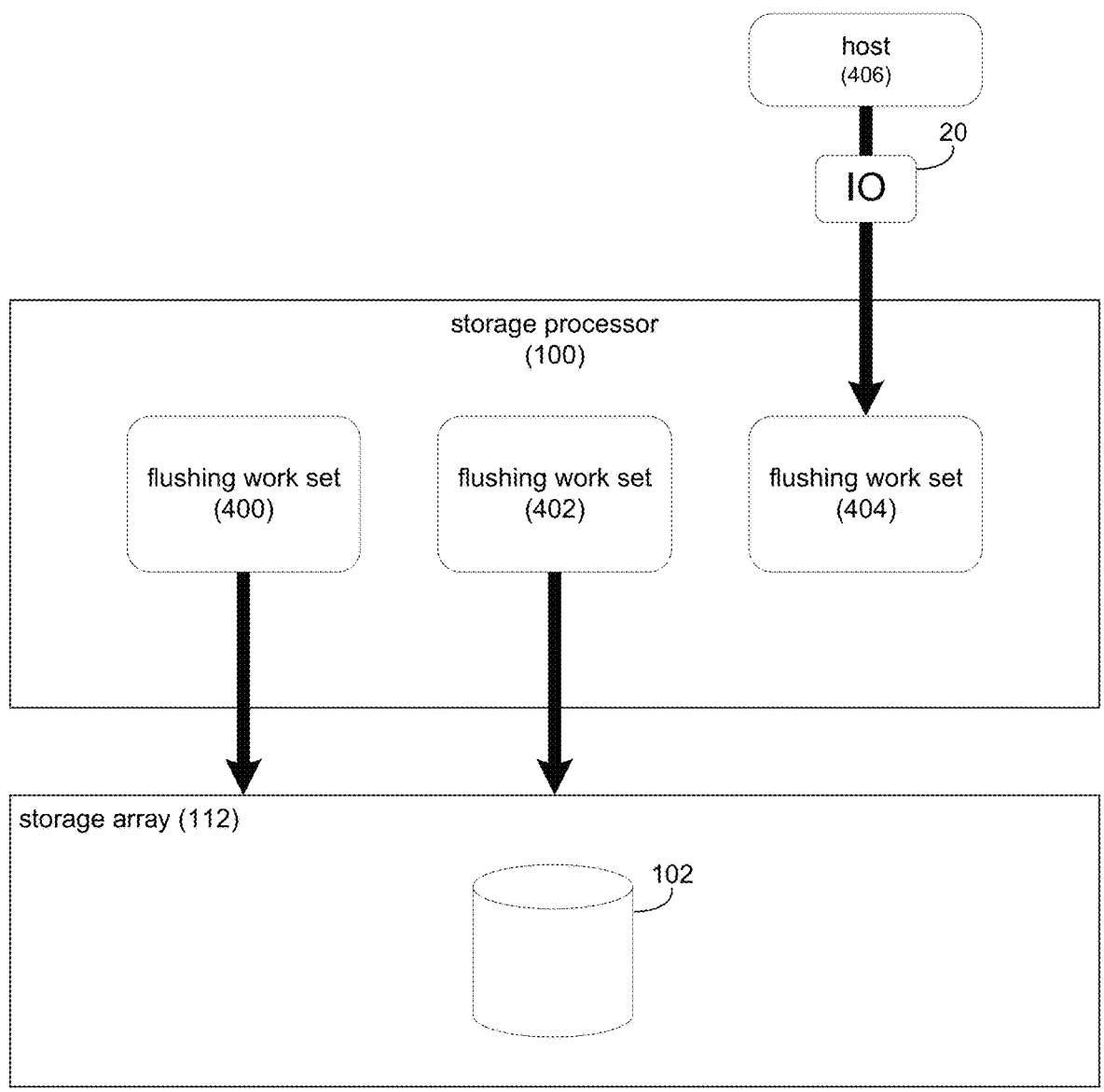
FIG. 4 is an example diagrammatic view of the storage system of FIG. 1 according to one or more example implementations of the disclosure.

Referring also to FIG. 4, storage processor 100 may include a plurality of flushing work sets. A flushing work set is a portion of memory within the storage processor for aggregating data to be flushed to persistent memory of the storage system (e.g., to a storage object within the storage array). In some implementations, a flushing work set is formed from a pool of memory that is allocated for storing "dirty" data (i.e., data that needs to be flushed). As will be discussed in greater detail below, multiple flushing work sets may be used to aggregate and flush dirty pages to persistent storage in batches. As shown in FIG. 4, suppose storage processor 100 includes a plurality of flushing work sets (e.g., flushing work sets 400, 402, 404). In some implementations, a host (e.g., host 406) sends IO requests (e.g., IO 20) to storage processor 100 for processing in persistent storage of the storage array (e.g., storage array 114). Storage management process 10 may initially or first add dirty data associated with IO requests to flushing work set 400. Once flushing work set 400 is full or reaches some predefined threshold, storage management process 10 "freezes" flushing work set 400 from receiving further dirty data and begins to aggregate dirty data in flushing work set 402. Once frozen, storage management process 10 flushes the dirty data from flushing work set 400 to storage array 112. Storage management process 10 continues to aggregate dirty data in flushing work set 402 until flushing work set 402 is full or reaches a predefined storage capacity. Storage management process 10 freezes flushing work set 402 and aggregates new dirty data in flushing work set 404.

As flushing data from a frozen flushing work set typically takes more time than adding dirty data to the active flushing work set, multiple flushing work sets may be frozen at one time. As shown in FIG. 4, flushing work sets 400, 402 are frozen and flushing work set 404 is actively receiving dirty data. Storage management process 10 flushes dirty data from flushing work sets 400, 402 to persistent storage in storage array 112. Conventional approaches to processing dirty data with flushing work sets require the entirety of a frozen flushing work set to be flushed before reallocating any memory assigned to another flushing work set or for other memory needs.

Figure 5:
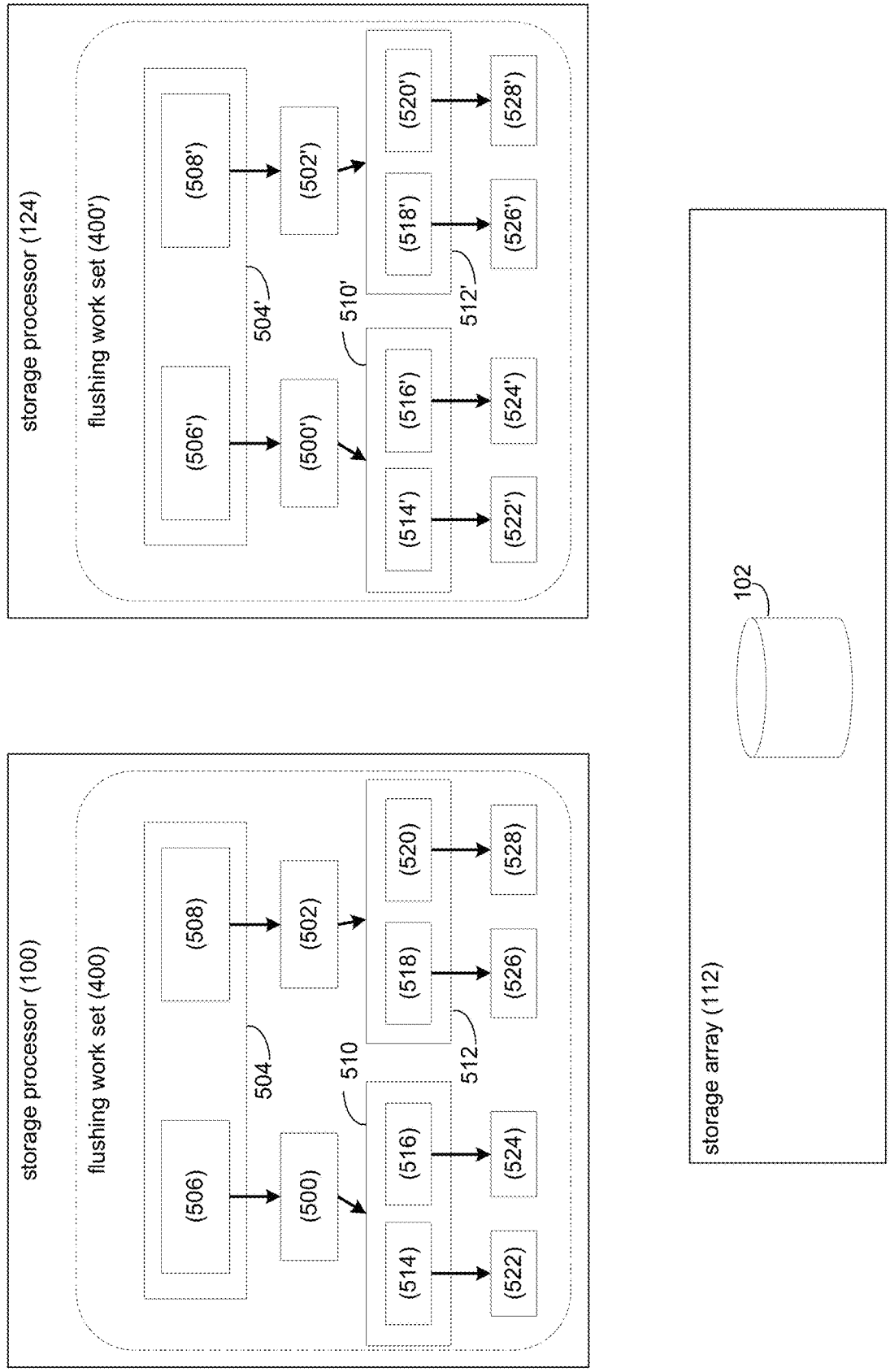
FIGS. 5-6 are example diagrammatic views of mirrored flushing work sets according to example implementations of the disclosure.

Referring also to FIG. 5 and in some implementations, each flushing work set is mirrored across each storage processor of the active-active storage cluster. For example, suppose flushing work set 400 is frozen (e.g., in response to flushing work set 400 being full or reaching a predefined storage capacity threshold). In this example, as flushing work set is common to each storage processor, flushing work set is a common flushing work set as described hereafter. As shown in FIG. 5, flushing work set 400 includes a plurality of extent storage objects (e.g., extent storage objects 500, 502) managed by an extent hash table (e.g., extent hash table 504). An extent storage object is a storage object that holds a plurality of leaf storage objects. The extent storage object is a large storage object configured to store more granular storage objects. Extent hash table 504 is a hash table that manages each extent storage object of the flushing working set in one or more buckets (e.g., buckets 506, 508).

In some implementations, each extent storage object includes a leaf hash table and a plurality of containers. A leaf hash table (e.g., leaf hash tables 510, 512) is a hash table that manages each container of the flushing working set in one or more buckets (e.g., buckets 514, 516, 518, 520). A container (e.g., containers 522, 524, 526, 528) is a page list that is defined by a contiguous logical block address (LBA) range. Logged pages to be flushed that belong to the same LBA range are linked to the same container.

As shown in FIG. 5, as common flushing work set 400 is mirrored across both storage processors 100 and 124, the respective extent storage objects, hash tables, and containers are represented in storage processor 124 with a prime (') added to each respective reference number (i.e., flushing work set 400'). In this example, container 522 and container 522' are mirrored copies of each other with container 522 within flushing work set 400 on storage processor 100 and container 522' within flushing work set 400' on storage processor 124.

In some implementations, storage management process 10 assigns 300 flush ownership for a plurality of containers of a common frozen flushing work set to a storage processor of a pair of storage processors of a storage system. For example, with mirrored data across the common frozen flushing work set, storage management process 10 uses both storage processors to flush the data to persistent storage in the storage array. In order to avoid expensive coordination between storage processors, storage management process 10 assigns flush ownership for each container of the common frozen flushing work set to a particular storage processor of the pair of storage processors. For example and in some implementations, storage management process 10 may assign 300 flush ownership for each storage processor independently. In this manner, storage containers shared in a common frozen flushing set are independently assigned to each storage processor without coordinating between the storage processors.

Figure 6:
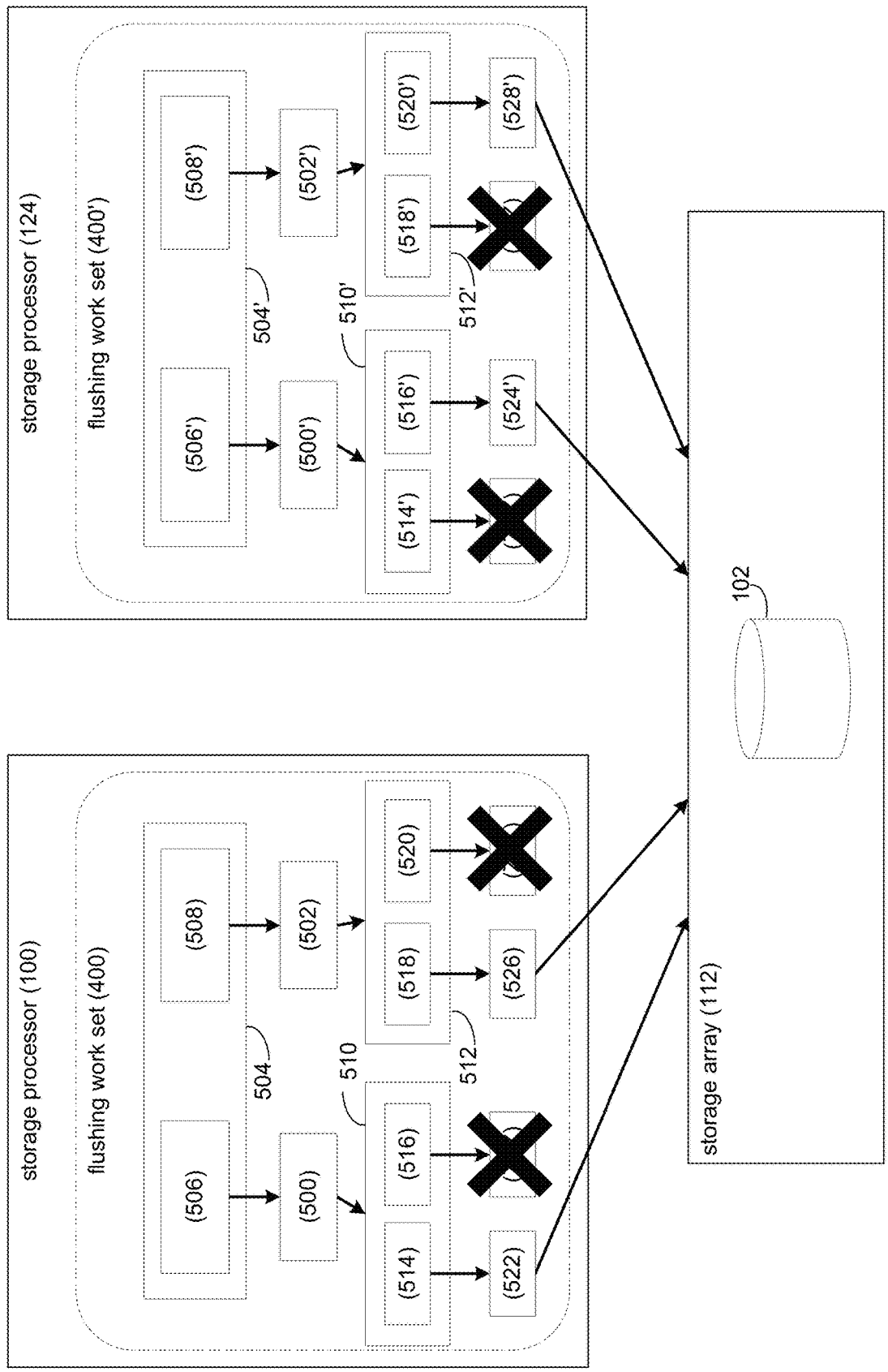

In some implementations, storage management process 10 assigns 300 flush ownership for the plurality of containers of a common frozen flushing work set based upon, at least in part, the storage processor that received the first IO request associated with a particular container. For example, suppose storage processor 100 receives an IO request associated with a particular LBA range. In this example, suppose that the LBA range is associated with container 522 and that no other IO requests associated with this LBA range were received previously. Accordingly, when frozen, storage management process 10 assigns 300 flush ownership for container 522 to storage processor 100. Referring also to FIG. 6, suppose storage management process 10 assigns 522 flush ownership for containers 522 and 526 to storage processor 100 and containers 524 and 528 to storage processor 124. While one example has been provided for assigning 300 flush ownership for the plurality of containers, it will be appreciated that this is for example purposes only and that other approaches may be used within the scope of the present disclosure.

In some implementations, for each container of the plurality of containers of the common frozen flushing work set not assigned to a particular storage processor, storage management process 10 reclaims 302 the storage space of the container not assigned to the particular storage processor. As discussed above and in some implementations, each flushing work set is formed from storage space or memory allocated from a storage processor. In some implementations, this storage space is associated with a high performance storage device (e.g., a solid state drive or cache memory system). Accordingly, storage management process 10 reclaims 302 unneeded storage space whenever possible. Conventional approaches using flushing work sets require that the flushing of data from all containers of the flushing work set be complete before any container is reclaimed for other storage purposes.

In some implementations, storage management process 10 is able to reclaim 302 the storage space of the container not assigned to the particular storage processor without waiting for any flushing to be completed. In this manner, storage management process 10 reclaims 302 any containers not assigned to the storage node for use in another flushing work set and/or for other data storage needs. Referring again to FIG. 6, suppose containers 524 and 528 are not assigned to storage processor 100 and that containers 522' and 526' are not assigned to storage processor 124. In this example, storage management process 10 reclaims 302 (e.g., represented by the "X") containers 524 and 528 on storage processor 100 and containers 522' and 526' on storage processor 124. As discussed above, reclaimed storage containers 522', 524, 526', and 528 may be reallocated for various purposes within the scope of the present disclosure.

In some implementations, for each container of the plurality of containers of the common frozen flushing work set assigned to a particular storage processor, storage management process 10 flushes 304 data stored in the container assigned to the particular storage processor to persistent memory of the storage system. Flushing 304 data stored in the container assigned to a particular storage processor includes writing the data from the container into persistent memory of a storage array. Referring again to FIG. 6, suppose containers 522 and 526 are assigned to storage processor 100 and that containers 524' and 528' are assigned to storage processor 124. In this example, storage management process 10 flushes 304 containers 522 and 526 on storage processor 100 and containers 524' and 528' on storage processor 124. Storage management process 10 flushes each container assigned to the respective storage processor until all containers are either reclaimed or flushed. Once flushed, storage management process 10 reclaims any remaining containers. Continuing with the above example, once containers 522, 524', 526, and 528' are flushed, storage management process 10 reclaims these containers such that all of flushing work set 400 is reallocated for an active flushing work set and/or for other storage needs.

In some implementations, an XCOPY source container set is assigned to a first storage processor and an XCOPY destination container set is assigned to a second storage processor. An extended copy (XCOPY) command is a special type of copy command for copying multiple files or entire directory trees from one directory to another and for copying files across a network. In contrast to a conventional copy command, XCOPY commands can: copy directories; copy all files including subdirectories recursively and can replicate the source directory structure as is; and exclude files based on file name or extension; and can help identify updated files (e.g., based on archive attribute or based on a given cutoff date).

Figure 7:
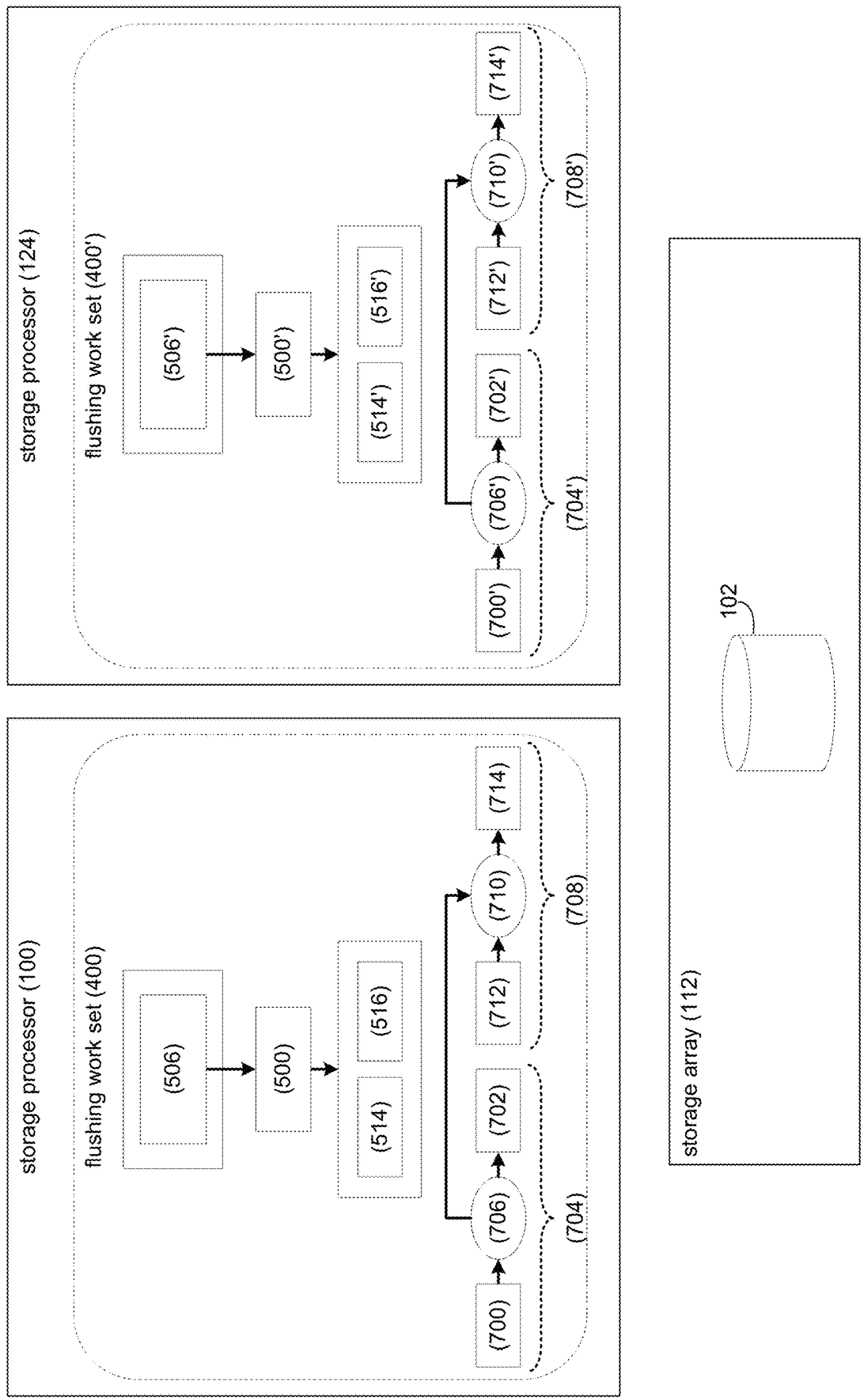
FIGS. 7-8 are example diagrammatic views of flushing XCOPY commands according to example implementations of the disclosure.

Referring also to FIG. 7 and in some implementations, an XCOPY command may introduce a flush dependency. For example, suppose an XCOPY command involves the copying of a container (e.g., container 700) to create a container copy (e.g., container 702). This is reflected as an XCOPY source container set (e.g., XCOPY source container set 704) where XCOPY command source 706 is placed as a flush barrier between container 700 and container 702. Accordingly, container 702 cannot be flushed until both container 700 and XCOPY command source 706 are flushed. This is also reflected on the destination side with an XCOPY destination container set (e.g., XCOPY destination container set 708) where XCOPY command destination 710 is placed as a flush barrier between container 712 and container 714 (where container 712 is a copy of container 700 and container 714 is a copy of container 702). Accordingly, container 714 cannot be flushed until both container 712 and XCOPY command destination 710 are flushed. In this manner, the XCOPY command introduces flushing dependency between these containers (e.g., containers 712 and 714).

In some implementations, flushing the XCOPY source container set assigned to the first storage processor includes: flushing 308 a plurality of containers received before the XCOPY command from the XCOPY source container, executing 310 the XCOPY command using the first storage processor, and flushing 312 a plurality of containers received after the XCOPY command from the XCOPY source container. For example, suppose storage management process 10 assigns an XCOPY source container set (e.g., XCOPY source container set 704) to one storage processor (e.g., storage processor 100) and assigns the XCOPY destination container set (e.g., XCOPY destination container set 708') to another storage processor (e.g., storage processor 124).

Figure 8:
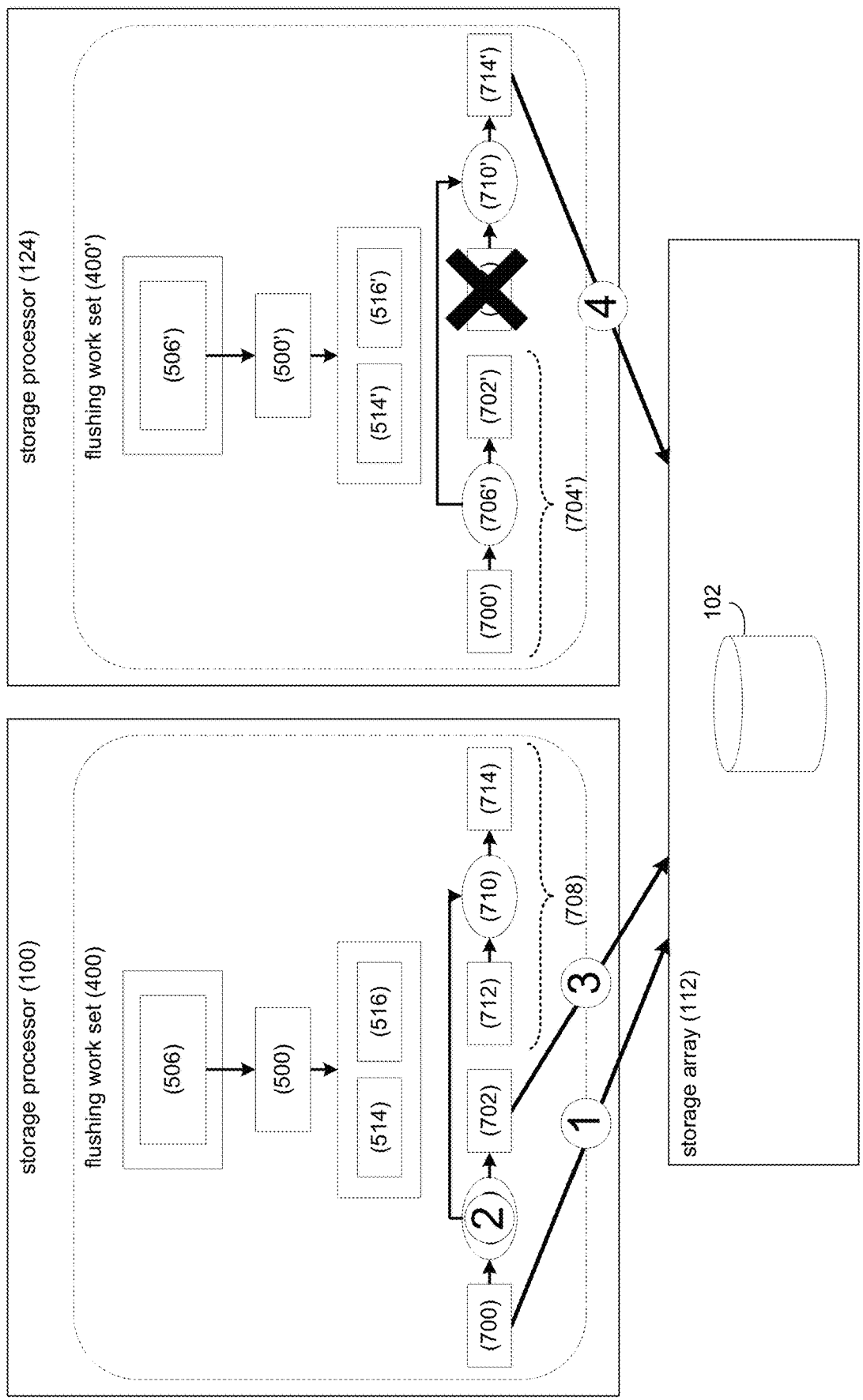

In this example, there is a flush dependency between container 700, XCOPY command source 706, and container 702. As such, storage management process 10 flushes 308 a plurality of containers received before the XCOPY command (e.g., container 700) from XCOPY source container set 704. Storage management process 10 executes 310 the XCOPY command using the first storage processor (e.g., storage processor 100). Storage management process 10 then flushes a plurality of containers received after the XCOPY command (e.g., container 702) from XCOPY source container set 704. As shown in FIG. 8, storage management process 10 flushes 308 container 700 from XCOPY source container set 704 (shown as action "1") and executes 310 XCOPY command source 706 (shown as action "2"). Storage management process 10 then flushes 312 container 702 from XCOPY source container set 704 (shown as action "3").

In some implementations, flushing the XCOPY destination container set assigned to the second storage processor includes flushing 314 a plurality of containers received after the XCOPY command from the XCOPY destination container set assigned to the second storage processor in response to executing the XCOPY command using the first storage processor. Continuing with the above example, suppose that storage management process 10 determines that XCOPY command is executed. For example, after the XCOPY command execution is completed, a XCOPY done transaction starts and both XCOPY command source 706 and XCOPY command destination 710 are removed. In some implementations, storage management process 10 flushes 314 the plurality of containers received after the XCOPY command from the XCOPY destination container set assigned to the second storage processor. As shown in FIG. 8, storage management process 10 flushes 314 container 714' from XCOPY destination container set 708' (shown as action "4"). Additionally, storage management process 10 reclaims container 712' without flushing container 712' because container 712' is automatically invalidated after receiving the XCOPY command. In this manner, storage management process 10 addresses flushing dependencies and avoids wasted flushing.

In some implementations and during a fail over, the surviving storage processor recovers the containers which were owned by the failed storage processor since those containers are already invalidated because of the early reclaim scheme. Storage management process 10 detects 316 a storage processor failure event. For example, storage management process 10 may use a connection between storage processors to determine a storage processor failure event. However, it will be appreciated that other approaches may be used to detect 316 a storage processor failure event within the scope of the present disclosure.

In some implementations, storage management process 10 pauses 318 IO command processing for IO commands received after detecting the storage processor failure event. For example, in response to detecting the storage processor failure event, storage management process 10 pauses future IO command processing until the surviving storage processor has recovered the containers assigned to the failed storage processor. In some implementations, storage management process 10 identifies 320 a plurality of containers assigned to the failed storage processor. For example, storage management process 10 may scan a page descriptor ring or other storage object to identify the containers assigned to the failed storage processor.

In some implementations, storage management process 10 reconstructs 322 the plurality of identified containers assigned to the failed storage processor in a surviving storage processor. When each of the identified containers are reconstructed, storage management process 10 resumes IO command processing. Referring again to FIG. 5, suppose that storage management process 10 detects 316 that storage processor 124 has failed. In this example, storage management process 10 pauses 318 IO command processing and identifies 320 containers associated with storage processor 124. Accordingly, storage management process 10 identifies 320 containers 524' and 528' assigned to storage processor 124. Storage management process 10 reconstructs 322 containers 524 and 528 from a page descriptor ring. Accordingly, storage management process 10 resumes 324 IO command processing in response to reconstructing containers 524 and 528. In this manner, storage management process 10 is able to recover assigned containers from a failed storage processor.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc. Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    assigning flush ownership for a plurality of containers of a common frozen flushing work set to a storage processor of a pair of storage processors of a storage system;
    for each container of the plurality of containers of the common frozen flushing work set not assigned to a particular storage processor, reclaiming a storage space of the container not assigned to the particular storage processor; and
    for each container of the plurality of containers of the common frozen flushing work set assigned to a particular storage processor, flushing data stored in the container assigned to the particular storage processor to persistent memory of the storage system.

2. The computer-implemented method of claim 1, wherein the pair of storage processors define an active-active cluster.

3. The computer-implemented method of claim 2, further comprising:
    processing a plurality of write input/output (IO) operations on the active-active cluster by mirroring the plurality of write IO operations on each storage processor of the active-active cluster.

4. The computer-implemented method of claim 1, wherein the common frozen flushing work set includes a plurality of extent storage objects, wherein the plurality of extent storage objects includes the plurality of containers.

5. The computer-implemented method of claim 1, wherein an XCOPY source container set is assigned to a first storage processor and an XCOPY destination container set is assigned to a second storage processor.

6. The computer-implemented method of claim 5, wherein flushing the XCOPY source container set assigned to the first storage processor includes:
    flushing a plurality of containers received before the XCOPY command from the XCOPY source container set,
    executing the XCOPY command using the first storage processor, and
    flushing a plurality of containers received after the XCOPY command from the XCOPY source container set; and
    wherein flushing the XCOPY destination container set assigned to the second storage processor includes:
    flushing a plurality of containers received after the XCOPY command from the XCOPY destination container set assigned to the second storage processor in response to executing the XCOPY command using the first storage processor.

7. The computer-implemented method of claim 1, further comprising:
   detecting a storage processor failure event;
   pausing IO command processing for IO commands received after detecting the storage processor failure event;
   identifying a plurality of containers assigned to the failed storage processor;
   reconstructing the plurality of identified containers assigned to the failed storage processor in a surviving storage processor; and
   resuming IO command processing.

8. A computer program product residing on a non-transitory computer readable medium having a plurality of instructions stored thereon which, when executed by a processor, cause the processor to perform operations comprising:
   assigning flush ownership for a plurality of containers of a common frozen flushing work set to a storage processor of a pair of storage processors of a storage system;
   for each container of the plurality of containers of the common frozen flushing work set not assigned to a particular storage processor, reclaiming a storage space of the container not assigned to the particular storage processor; and
   for each container of the plurality of containers of the common frozen flushing work set assigned to a particular storage processor, flushing data stored in the container assigned to the particular storage processor to persistent memory of the storage system.

9. The computer program product of claim 8, wherein the pair of storage processors define an active-active cluster.

10. The computer program product of claim 9, wherein the operations further comprise:
    processing a plurality of write input/output (IO) operations on the active-active cluster by mirroring the plurality of write IO operations on each storage processor of the active-active cluster.

11. The computer program product of claim 8, wherein the common frozen flushing work set includes a plurality of extent storage objects, wherein the plurality of extent storage objects includes the plurality of containers.

12. The computer program product of claim 8, wherein an XCOPY source container set is assigned to a first storage processor and an XCOPY destination container set is assigned to a second storage processor.

13. The computer program product of claim 12, wherein flushing the XCOPY source container set assigned to the first storage processor includes:
    flushing a plurality of containers received before the XCOPY command from the XCOPY source container set,
    executing the XCOPY command using the first storage processor, and
    flushing a plurality of containers received after the XCOPY command from the XCOPY source container set; and
    wherein flushing the XCOPY destination container set assigned to the second storage processor includes:
    flushing a plurality of containers received after the XCOPY command from the XCOPY destination container set assigned to the second storage processor in response to executing the XCOPY command using the first storage processor.

14. The computer program product of claim 8, wherein the operations further comprise:
    detecting a storage processor failure event;
    pausing IO command processing for IO commands received after detecting the storage processor failure event;
    identifying a plurality of containers assigned to the failed storage processor;
    reconstructing the plurality of identified containers assigned to the failed storage processor in a surviving storage processor; and
    resuming IO command processing.

15. A computing system comprising: a memory; and a processor configured to assign flush ownership for a plurality of containers of a common frozen flushing work set to a storage processor of a pair of storage processors of a storage system, wherein the processor is further configured to reclaim a storage space of the container not assigned to the particular storage processor for each container of the plurality of containers of the common frozen flushing work set not assigned to a particular storage processor, and wherein the processor is further configured to flush data stored in the container assigned to the particular storage processor to persistent memory of the storage system for each container of the plurality of containers of the common frozen flushing work set assigned to a particular storage processor.

16. The computing system of claim 15, wherein the pair of storage processors define an active-active cluster.

17. The computing system of claim 16, wherein the processor is further configured to:
    processing a plurality of write input/output (IO) operations on the active-active cluster by mirroring the plurality of write IO operations on each storage processor of the active-active cluster.

18. The computing system of claim 15, wherein the common frozen flushing work set includes a plurality of extent storage objects, wherein the plurality of extent storage objects includes the plurality of containers.

19. The computing system of claim 15, wherein an XCOPY source container set is assigned to a first storage processor and an XCOPY destination container set is assigned to a second storage processor.

20. The computing system of claim 19, wherein flushing the XCOPY source container set assigned to the first storage processor includes:
    flushing a plurality of containers received before the XCOPY command from the XCOPY source container set,
    executing the XCOPY command using the first storage processor, and
    flushing a plurality of containers received after the XCOPY command from the XCOPY source container set; and
    wherein flushing the XCOPY destination container set assigned to the second storage processor includes:
    flushing a plurality of containers received after the XCOPY command from the XCOPY destination container set assigned to the second storage processor in response to executing the XCOPY command using the first storage processor.

\* \* \* \* \*